July 5, 1932.  W. C. NEIN ET AL  1,866,507
ALTERNATING CURRENT MOTOR
Filed April 28, 1930

W. C. Nein
and T. W. Varley    INVENTORS
BY
Thomas Howe   ATTORNEY

Patented July 5, 1932

1,866,507

UNITED STATES PATENT OFFICE

WILLIAM C. NEIN AND THOMAS W. VARLEY, OF NEW YORK, N. Y.

ALTERNATING CURRENT MOTOR

Application filed April 28, 1930. Serial No. 448,010.

This invention relates to alternating current motors and is especially adapted to motors of the synchronous, self-starting type.

The main object of the invention is to provide an alternating current motor which, while satisfactorily fulfilling all of its expected functions, shall be simple and of low cost to manufacture.

A further object of the invention is to provide a motor of the character as indicated wherein the forces acting upon the rotor shall tend to continually move the rotor in one direction of its longitudinal axis so that the rotor is not subject to forces tending to move it first in one direction and then in the other. By this provision "chattering" of the rotor in its bearings is prevented with consequent quietness in running and relief of the bearings from a considerable amount of wear.

A still further object of the invention is to provide means whereby if the current supplied to the motor ceases for longer than a predetermined period, the renewed application of current to the motor will not start it, but if the current to the motor is renewed within such predetermined period the motor will start and continue running. This feature has application in connection with the use of the motor for driving clocks as well as in other uses. Where the motor is used for driving a clock, it will be apparent that if the current to the motor fails the clock will stop. If, when the current supply to the clock is renewed, the clock starts to run, it is apparent that the time as indicated by the clock will be slow to the extent of the period of stoppage. It is not usually material if the time indicated by the clock varies from the correct time by a very small amount, but this variation is objectionable if too great. According to the feature of the present invention just referred to, if the current is reapplied within a predetermined period, say a minute, after it has been cut off the clock will start up, but if the period of discontinuance of the current is greater than the predetermined period, say a minute, the clock will not start up. The result is that if the period of cessation of current is longer than the predetermined period, the clock will not start and, not being running, this will be a signal to the observer that it is no longer keeping time and will lead to the necessary adjustment to bring it back into service. On the other hand whenever the clock is running it will ordinarily be the case that it has not ceased to run for a longer period than that predetermined, say a minute, so that the clock probably will not vary from being correct by more than the predetermined period so long as it is running. It is true that if the current should be cut off several times for a less period each time than the predetermined period, the clock would still be running and it would be slow by an amount of time equal to the added periods of stoppage which might be greater than the predetermined period. Ordinarily, however, there would not be more than one stoppage between successive times of checking up the clock so that ordinarily if the clock is running any stoppage has not been sufficient to cause its indicated time to vary from the correct by more than the predetermined period.

Other and ancillary objects of the invention will appear hereinafter.

In the accompanying drawing which illustrates the invention—

Figure 3:
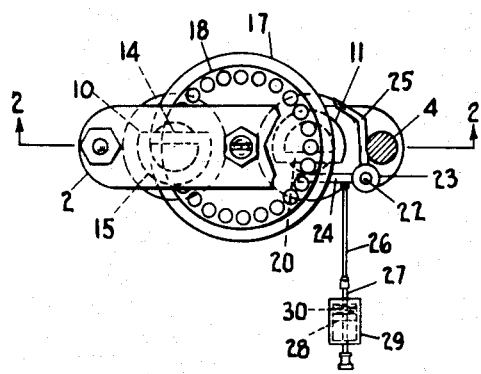
Fig. 3 is a top plan view of the apparatus of Figs. 1 and 2.
Figure 4:
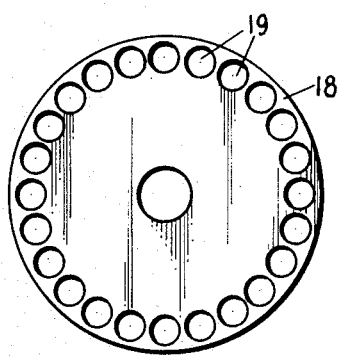
Fig. 4 is an enlarged plan view of the perforated magnetic disk forming a part of the rotor of the apparatus of Figs. 1, 2 and 3.
Figure 5:
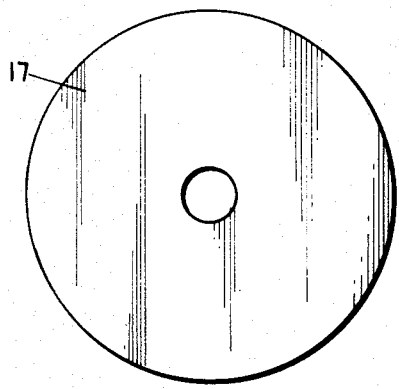
Fig. 5 is a plan view of a metal disk of non-magnetic material forming a part of the rotor of the motor of Figs. 1, 2 and 3.

Referring to the drawing, the stator or field member comprises the frame or yoke including the members 1 and 2 of magnetic material, as iron, spaced apart and secured together by the posts 3 and 4 of non-magnetic material, as brass. The members 1 and 2 may constitute the supporting means for the motor. Secured to the member 1 are cores 5 and 6 of magnetic material which are encircled by the main coils 7 and 8 of the stator winding. These coils 7 and 8 are connetced in series across the single phase alternating current supply lines 9, and in such relation as to produce opposite polarities in their respective pole faces. Also shading coils 10 and 11 are mounted in the pole faces 12 and 13. These shading coils are each a solid continuous ring of copper of the shape as shown clearly in Fig. 3, one side of each shading coil having a straight side 14 passing through a slot in the end of the pole face and a circular portion 15 passing about the outside of the pole. These shading coils operate in conjunction with the magnetism produced by the coils 7 and 8 to produce a shifting magnetic field as is well understood.

The rotor comprises an arbor 16 mounted in bearings in the members 1 and 2. This arbor has fixed upon it the copper disk 17 which is opposite the pole faces 12 and 13 and upon the opposite side of the disk 17 from the pole faces 12 and 13 is the perforated disk 18 of iron also fixed upon the arbor 16.

It is to be observed that the magnetism passes from one pole face of the stator through the copper disk 17 into the iron disk 18, again through the copper disk and into the other pole face of the stator. There is also a magnetic circuit in parallel to that afforded by the disk 18, through the yoke 2, but this has ordinarily little effect upon the operation of the motor and may be varied in its distance from the rotating disks without materially affecting the motor operation.

For best results the line of centers of the perforations 19 in the disk 18 should be directly beneath the centers of the stator pole pieces and that portion 20 of each stator pole face, which is outside of the shading coil, should be equal in width to the distance from the center of one perforation of the disk 18 to the edge of an adjoining perforation. Also the stator poles should be so located with relation to the perforations in the disk 18 that the centers of any two pole faces will be displaced from each other about the axis of the motor by an angle which is equal to the angular displacement of the centers of two perforations. In other words, when the center of one stator pole face is directly over the center of a perforation the centers of the other pole faces should be over the centers of other perforations. In the motor illustrated the centers of the stator pole faces are displaced from each other about the axis of the motor by 180°, and when the center of one pole face is over the center of one perforation the center of the other pole face is over the center of a perforation 180° removed from the perforation over which the other pole face center is located.

The perforated disk 18 has a synchronizing action, keeping the speed of the rotor in fixed relation to the frequency of the magnetic field, the speed depending upon the number of perforations. The copper disk is the torque member in which currents are induced in a well known manner by the shifting field.

In order to prevent the motor from starting in case there is a cessation of current for more than a predetermined period, there is an arbor 22 mounted in the plates or members 1 and 2 so that it may rock therein. Fixed upon the arbor 22 is a member comprising the hub 23 from which project the arms 24 and 25. The arm 25 is adapted when turned to come against the rim of the rotor disk 17. The arm 24 is of magnetic material and is adapted to be attracted toward the side of the pole piece 6 when the pole piece is energized. When so attracted the arbor 22 is turned so that the arm 25 is held out of contact with the disk 17. The arm 24 is connected by a pivoted link 26 with the piston rod 27 fixed to the piston 28 which slides in the cyl'nder 29. A spring 30 interposed between the end of the cylinder 29 and the piston 28 tends to move the piston to draw the arm 24 away from the pole piece and to bring the arm 25 against the disk 17. When the pole piece is energized the arm 24 is attracted thereto and the arm 25 is removed from engagement with the disk 17 so that the running of the motor is not interfered with. If, however, the supply current ceases so that the pole becomes deenergized the arm 24 will be released and the spring 30 will move the arm 24 away from the pole piece and the arm 25 toward the disk 17. This movement can be made at any speed desired by providing a suitable fluid in the cylinder 29 so that it will act as a dashpot. If the current is re-applied to the motor before the arm 24 is moved to a certain distance away from the pole piece, the arm 24 will be again attracted and the brake member 25 removed and held from engagement with the disk 17. If, however, the arm 24 moves more than that certain distance away from the pole piece there will be no longer sufficient magnetic pull to draw the arm 24 toward the pole piece when the current is again supplied. The time during which the arm 24 moves to that certain distance from the pole piece is regulated to the desired predetermined period. It will now be apparent that if the current ceases for a longer time than the period necessary to the movement of the arm 24 outside of the retracting influence of the pole piece, the brake arm 25 will be applied to the disk 17 and the rotor locked against starting up even if the current is reapplied. On the other hand if the current is reapplied sooner than the period necessary for the arm 24 to be moved out of retracting influence of the pole piece, the arm 24 will be retracted upon reapplication of the current, the locking or braking means will not be applied to the rotor and the motor will start up. Furthermore, it now being apparent that if there has been cessation of the current for longer than the predetermined period the motor will be stopped, the operator or observer will be put on notice that something is out of order and that repairs or adjustments should be made, while if the motor is running there will be the probability that it has not ceased operation for more than the predetermined time. This is of importance in connection with the driving of clocks as has been above referred to.

Figure 1:
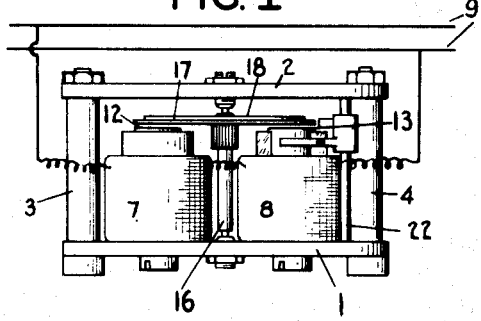
Fig. 1 is a full size side elevation of a motor.
Figure 2:
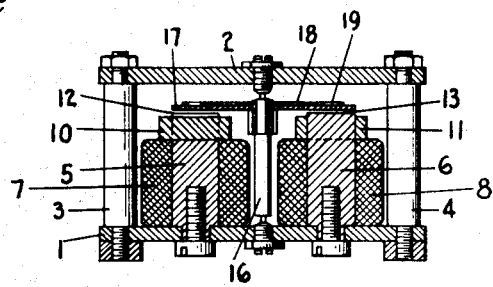
Fig. 2 is an axial section of the motor shown in Fig. 1, such section being taken on the line 2—2 of Fig. 3.

The pole pieces 5 and 6 being arranged below the disk 17 and 18, as clearly appears from Figs. 1 and 2, the pull exercised upon the rotor along its axis by the magnetic field and also by gravity will be in the same direction, i. e., downwardly, so that there will be no reversal of direction of the resultant of the forces so acting upon the rotor, under the rise and fall of magnetism with the supplied current, and consequently "chattering" of the rotor in its bearings is prevented.

While the invention has been illustrated in what is considered its best application it may have other embodiments without departing from its spirit and is not therefore limited to the structure shown in the drawing:

What we claim is:

1. The combination with a field member of a rotor, said rotor comprising a disk of magnetic material having openings therethrough and a disk of non-magnetic material, said disks being fixed upon a rotatably mounted shaft, said field having poles of opposite polarity on the same side of said disks.

2. The combination with a field member of a rotor, said rotor comprising a disk of magnetic material having openings therethrough and a disk of non-magnetic material, said disks being fixed upon a rotatably mounted shaft, said field having poles of opposite polarity on the same side of said disks, said disk of magnetic material being located upon the opposite side of said disk of non-magnetic material from said poles.

3. The combination with a field member of a rotor, said rotor comprising a disk of magnetic material having openings therethrough and a disk of non-magnetic material, said disks being fixed upon a rotatably mounted shaft, said field having poles of opposite polarity on the same side of said disks, said poles being located beneath said disks whereby their pull upon the rotor is in the same direction as the force of gravity.

4. The combination with a single phase alternating current supply, of a motor comprising a field member having poles, windings upon said poles and connected with said supply, shading coils on said poles, a rotor comprising a rotatable shaft, a disk of magnetic material having perforations and a disk of non-magnetic material, said disks being fixed upon said shaft and said disk of non-magnetic material being located between said poles and said disk of magnetic material, said poles being of opposite polarities and located upon the same side of said disks.

5. An electric current motor comprising frame members secured together and spaced apart, a rotor located between said members and journaled in said members, said rotor comprising a disk of magnetic material having perforations and a disk of non-magnetic material, pole pieces located between said members and secured to one of said members, windings upon said pole pieces, said shaft being parallel to the axes of said pole pieces and said disks being located between said pole pieces and the one of said members other than that to which the said pole pieces are secured.

6. The combination with a motor comprising a stator, a rotor, of means adapted to be moved into and out of engagement with said stator for locking the rotor against movement, time controlled means for moving said locking means into locking position with relation to said rotor, said locking means being controlled by the magnetism of said motor.

7. The combination with an electric motor comprising a stator and a rotor, an electric source for supplying current to drive said rotor, locking means for locking said rotor against movement, and means for timing the movement of said locking means into locking position, said locking means being responsive to current from said source.

8. The combination with an electric motor comprising a stator and a rotor, of an electric source from which said motor is operated, means responsive to current from said source for locking said rotor against rotation under current supplied from said source and timing means controlling said locking means, said locking means being independent of said source when in rotor-locking position.

In testimony whereof we have signed this specification this 21st day of April, 1930.

WILLIAM C. NEIN.
THOMAS W. VARLEY.